(12) United States Patent
Zheng et al.

(10) Patent No.: US 8,070,240 B2
(45) Date of Patent: Dec. 6, 2011

(54) SPROCKETED DRIVE ASSEMBLY FOR TRACK-TYPE MACHINE

(75) Inventors: Jianping Zheng, Peroia, IL (US);
Daniel Marcel Désiré Angot, Peoria, IL (US); David Francis Schaefer, Princeville, IL (US); Selvaraj Kuppannan, Tamit Nadu (IN)

(73) Assignee: Caterpillar Inc., Peoria, IL (US)

( * ) Notice: Subject to any disclaimer, the term of this patent is extended or adjusted under 35 U.S.C. 154(b) by 96 days.

(21) Appl. No.: 12/316,932

(22) Filed: Dec. 18, 2008

(65) Prior Publication Data

US 2010/0156170 A1    Jun. 24, 2010

(51) Int. Cl.
*B62D 55/12* (2006.01)
(52) U.S. Cl. .................................. 305/195; 305/199
(58) Field of Classification Search .......... 305/136, 305/137, 195, 196, 199
See application file for complete search history.

(56) References Cited

U.S. PATENT DOCUMENTS

| | | | |
|---|---|---|---|
| 1,479,349 A * | 1/1924 | Wickersham ............. 305/199 |
| 1,480,527 A * | 1/1924 | Morse ..................... 474/148 |
| 2,003,528 A * | 6/1935 | Best ....................... 305/199 |
| 3,194,609 A * | 7/1965 | Thurlow .................. 305/196 |
| RE30,018 E * | 6/1979 | Clemens et al. ........... 474/152 |
| 5,829,850 A | 11/1998 | Ketting et al. |
| 5,876,295 A * | 3/1999 | Young .................... 474/156 |
| 6,036,614 A | 3/2000 | Baddaria |
| 6,206,491 B1 | 3/2001 | Hisamatsu |
| 6,536,853 B2 * | 3/2003 | Egle et al. ............... 305/195 |
| 6,726,293 B2 | 4/2004 | Anderton et al. |
| 7,201,242 B2 | 4/2007 | Tucker, Jr. |
| 2006/0252592 A1 | 11/2006 | Young |

OTHER PUBLICATIONS

Patent Cooperation Treaty (PCT) International Search Report, Jun. 29, 2010.

* cited by examiner

*Primary Examiner* — Russell D Stormer
(74) *Attorney, Agent, or Firm* — Finnegan, Henderson, Farabow, Garrett & Dunner LLP

(57) ABSTRACT

A sprocket assembly for a track-type machine comprises a plurality of teeth, radially-disposed about a center of the sprocket assembly, each of the plurality of teeth comprising opposing tooth flanks, wherein successive pairs of teeth defines a substantially concave channel for receiving therein a cylindrical pin member associated with a track link member of a continuous track chain, each tooth flank having a tooth angle less than about 17 degrees.

20 Claims, 3 Drawing Sheets

SPROCKETED DRIVE ASSEMBLY FOR TRACK-TYPE MACHINE

TECHNICAL FIELD

The present disclosure relates generally to drive assemblies for track-type machines and, more particularly, to a sprocketed drive assembly for traction devices associated with track-type machines.

BACKGROUND

Track-type machines typically include a track assembly having a plurality of interlocking links, each link being coupled to a ground-engaging traction panel. Adjacent links may be interconnected via a laterally disposed track pin to form a continuous chain. A rotatable bushing may be disposed about the track pin, the rotatable bushing being configured to rotate relative to the track pin. The rotatable bushing is adapted to engage a portion of a sprocketed drive hub. As a drive motor rotates the sprocketed drive hub, teeth of the sprocketed drive hub engage spaces between the bushings forcing the track link to move in the direction of rotation of the hub, thereby propelling the machine.

Because the rotatable bushing enables rotation of the track bushing relative to the track link, which decreases the friction at the interface between the bushing and the sprocket, track assemblies that employ the rotatable bushings may be less susceptible to wear caused by friction than track assemblies with stationary (i.e., non-rotatable) bushings. However, because the friction for track links having rotatable bushings is significantly lower than track links with stationary bushings, rotatable bushings may be more susceptible to accidental rolling or slipping out of the space defined by the teeth of the sprocket. Under heavy loading conditions, this slippage can cause the track to seemingly "jump" during operation of the machine, potentially leading to premature wear (or breakage) of the teeth of the drive sprocket. This phenomenon may also negatively impact the operator's ability to control the machine.

To reduce bushing slippage and track "jumping" caused by such slippage, some systems rely on increasing the width and size of the components that interact with the drive sprocket, thereby increasing the surface area of the component at the sprocket interface, which effectively increases the friction force—a force which must be overcome in order to for the bushing to slip or jump. For example, U.S. Pat. No. 7,201,242 ("the '242 patent") to Tucker, Jr. discloses a tracked-belt driven vehicle having a drive sprocket with spaces that interact with rubber drive lugs of a drive belt. In order to reduce the tendency of the rubber drive lugs to deform under heavy loading conditions (which can lead to slipping), the vehicle of the '242 patent employs drive lugs with larger-than-conventional width and height parameters that are designed to more precisely conform to the size and shape of the drive sprocket. Increasing the size of the drive lugs may increase the surface area of interaction between the drive sprocket and the drive lugs, potentially reducing the deforming effects of "point loading" on the lugs. By increasing the surface area of interaction, the prior art system may also effectively increase the friction force, reducing the likelihood of track slipping and/or jumping.

Although increasing the width and size of the drive sprocket and the drive lugs to increase the surface area of interaction therebetween may reduce deformation of the drive lugs and "jumping" of the drive belt in certain situations, it may have significant disadvantages. For example, increasing the amount of material on the track assembly may increase manufacturing and material costs of the machine. Furthermore, increasing the width and size of the drive sprocket and drive lugs may unnecessarily add to the weight of the track assembly, effectively decreasing the power to weight ratio (efficiency) of the machine.

The presently disclosed sprocketed drive assembly for a track-type machine is directed to overcoming one or more of the problems set forth above.

SUMMARY

In accordance with one aspect, the present disclosure is directed toward a sprocket assembly for a track-type machine. The sprocket assembly may comprise a plurality of teeth, radially-disposed about a center of the sprocket assembly. Each of the plurality of teeth comprises opposing tooth flanks, wherein successive pairs of teeth define a substantially concave channel for receiving therein a cylindrical pin member associated with a track link member of a continuous track chain, each tooth flank having a tooth angle less than about 17 degrees.

According to another aspect, the present disclosure is directed toward a track assembly for a track-type machine comprising a plurality of link members, a plurality of pin members, and a drive sprocket. Each of the plurality of pin members may be configured to couple adjacent link members together to form a track chain and may comprise a rotatable bushing disposed about a cylindrical surface thereof. The rotatable bushing may be configured to rotate relative to a respective pin member. The drive sprocket may comprise a plurality of teeth radially disposed about a center of the drive sprocket. Each of the plurality of teeth may comprise opposing tooth flanks, wherein a tooth flank of successive pairs of teeth defines a substantially concave channel for receiving therein the rotatable bushing, each tooth flank may having a tooth angle between about 10 degrees and about 17 degrees.

In accordance with another aspect, the present disclosure is directed toward a track-type machine comprising a plurality of link members, a plurality of pin members, a driving mechanism for generating a torque output and a drive sprocket operatively coupled to the driving mechanism and configured to rotate in response to the torque output generated by the driving mechanism. Each of the plurality of pin members may be configured to couple adjacent link members together to form a track chain and may comprise a rotatable bushing disposed about a cylindrical surface thereof. The rotatable bushing may be configured to rotate relative to a respective pin member. The drive sprocket may comprise a plurality of teeth radially disposed about a center of the drive sprocket. Each of the plurality of teeth comprises opposing tooth flanks, wherein a tooth flank of successive pairs of teeth defines a substantially concave channel for receiving therein the rotatable bushing, each tooth flank having a tooth angle less than about 17 degrees.

BRIEF DESCRIPTION OF THE DRAWINGS

FIG. 3b illustrates a perspective view of an exemplary tooth segment, for use with the sprocketed drive assembly of FIG. 3a.

DETAILED DESCRIPTION

Figure 1:
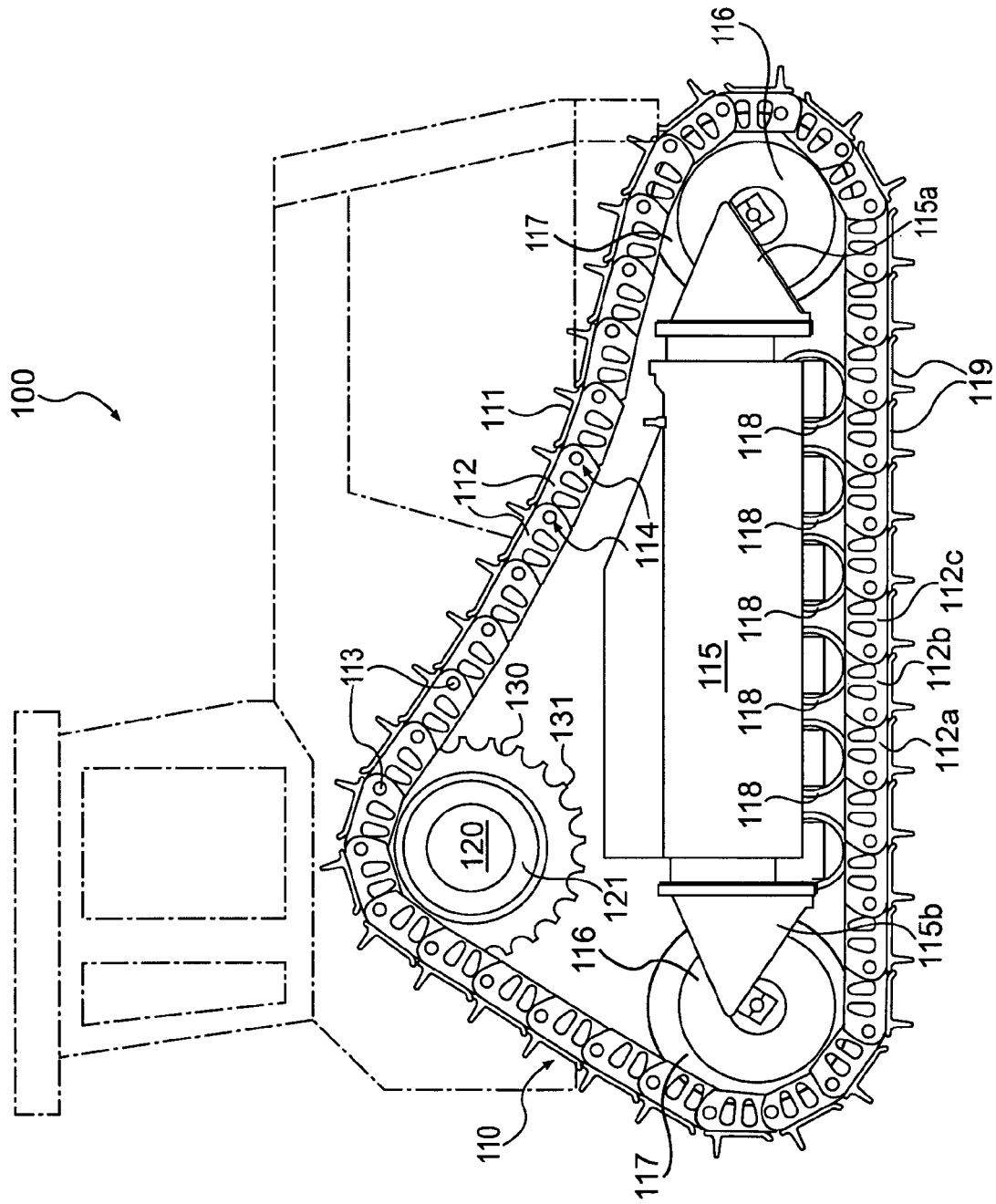
FIG. 1 illustrates an exemplary track-type machine consistent with the disclosed embodiments.

FIG. 1 illustrates an exemplary disclosed track-type machine 100 consistent with the disclosed embodiments. Track-type machine 100 may embody any machine that is driven, propelled, positioned, and/or maneuvered by operating a "continuous" track-type traction device. Such machines may include, for example, track-type tractors, skid steers, dozers, excavators, backhoes, track loaders, front shovels, or any other type of track-maneuverable machine. Track-type machine 100 may include a ground-engageable track assembly 110 and a driving mechanism 120 coupled to track assembly 110 by drive sprocket 130. Track assembly 110 may be configured to propel machine 100 when driven by driving mechanism 120.

Track assembly 110 may include a plurality of components that form the "continuous" track, ground-engaging portion of the drive system of machine 100. Track assembly 110 may include, among other things, a chain assembly 111 having a plurality of link members 112, a roller frame assembly 115, at least one idler 117, and a plurality of rollers 118. The components of track assembly 110 listed above are exemplary only and not intended to be limiting. Accordingly, it is contemplated that track assembly 110 may include additional and/or different components than those listed above. For example, track assembly 110 may also include a plurality of track shoes 119, which may be affixed to each of link members 112 to provide protective, treaded covering for link members 112.

Chain assembly 111 may comprise a plurality of link members 112 that are coupled together to form a continuous chain ground-engaging track. For example, adjacent (e.g., consecutive) link members, such as link members 112a, 112b, and 112c, may be coupled together via a plurality of pin members 113, each pin member having a rotatable bushing 114 disposed thereon. Rotatable bushing 114 may be engaged by drive sprocket 130, which is coupled to driving mechanism 120 (e.g., a motor). When rotated by driving mechanism 120, drive sprocket 130 may force chain assembly 111 to move in a direction of rotation of drive sprocket 130.

Roller frame assembly 115 may include one or more axles and/or any other suitable structure for supporting a substantial portion of the weight of machine 100. According to one embodiment, roller frame assembly 115 may embody the primary frame or chassis of machine 100, upon which many of the components (e.g., driving mechanism 120, operator cab, etc.) of machine 100 may be mounted and secured. Although FIG. 1 depicts track-type machine 100 as comprising a single roller frame assembly, it is contemplated that track-type machine 100 may include multiple roller frame assemblies. According to one embodiment, track-type machine 100 may comprise at least one roller frame assembly 115 for each track assembly 110 associated with machine 100.

Roller frame assembly 115 may include a first portion 115a and a second portion 115b. According to one embodiment, first portion 115a may embody the front end of roller frame assembly 115, and second portion 115b may embody the rear end of roller frame assembly 115. Each of first portion 115a and second portion 115b of roller frame assembly 115 may include an idler hub 116 adapted for mounting thereon an idler 117 for guiding the position of chain assembly 111.

Roller frame assembly 115 may be configured to receive a plurality of rollers 118 that cooperate to provide a platform upon which roller frame assembly 115 may roll during movement of track-type machine 100. Rollers 118 may embody any suitable type of heavy-duty wheel that may be configured to interact with chain assembly 111 so as to guide and position chain assembly 111 as it travels around roller frame assembly 115. Rollers 118 may be affixed to a bottom portion of roller frame assembly 115 such that a portion of each of rollers 118 travels atop bushings 112 substantially within a channel created by interlocking link members 112 of chain assembly 111.

As explained, each of first portion 115a and second portion 115b may include idler hub 116, upon which idler 117 may be mounted. Idler 117 provide a mechanical interface that guides chain assembly 111 around roller frame assembly 115 and provides lateral support for maintaining the position of chain assembly substantially beneath machine 100. For example, when track-type machine 100 is traveling forward, idler 117 associated with first portion 115a of roller frame assembly may receive chain assembly 111 from drive sprocket 130 and guide chain assembly 111 around front portion 115a, maintaining chain assembly 111 in position for engagement by rollers 118. Similarly, idler 117 associated with second portion 115b may receive chain assembly 111 from rollers 118 beneath roller frame assembly 111 and guide chain assembly 111 around second portion 115b, thereby maintaining chain position for engagement by drive sprocket 130.

Driving mechanism 120 may include one or more components configured to generate a torque output. For example, driving mechanism 120 may include any suitable type of internal combustion engine, such as a gasoline, diesel, natural gas, or hybrid-powered engine or turbine. Alternatively or additionally, driving mechanism 120 may embody an electric motor, electrically coupled to an electric power source and configured to convert at least a portion of the electrical energy form the electric power output into mechanical energy. According to yet another embodiment, driving mechanism may include a hydraulic motor, fluidly coupled to a hydraulic pump and configured to convert a fluid pressurized by the pump into a torque output.

Drive sprocket 130 may be coupled to driving mechanism 120 and configured to rotate in response to a torque output generated by driving mechanism 120. For example, drive sprocket 130 may be secured (e.g., welded, bolted, heat-coupled, etc.) to a hub 121 associated with a shaft (not shown), which may be coupled to driving mechanism 120. During operation of the machine, driving mechanism 120 may rotate the shaft, inducing a corresponding rotation of drive sprocket 130. According to one embodiment, drive sprocket 130 may be directly coupled via a drive shaft to driving mechanism 120. Alternatively, drive sprocket 130 may be coupled to driving mechanism 120 via a torque converter (such as a gearbox, transmission, etc.), so that rotation of drive sprocket 130 may be controlled/adjusted with respect to the torque generated by driving mechanism 120.

Drive sprocket 130 may include a plurality of teeth 131 configured to engage a portion of track assembly 110 such that a rotational force applied to drive sprocket is delivered to the track assembly 110. For example, each of the plurality of teeth 131 are configured to engage a space between adjacent pin members 113, with bushings 114 associated with pin members 113 configured to interface with spaces defined by opposing flanks of adjacent teeth 131. As drive sprocket 130 turns, teeth 131 of drive sprocket 130 "grab" bushings 114 of pin members 113 of chain assembly 111, forcing advancement of chain assembly 111 in the direction of rotation of drive sprocket 130.

Although FIG. 1 is illustrated as a "high-drive" machine (i.e., a machine with an elevated drive system and two idler wheels), it is contemplated that the configurations consistent with the disclosed embodiments may be implemented in any track-type machine. For example, drive sprocket configurations as described herein may be employed in an oval-track machine, where the drive sprocket is located in-line with a non-driving idler wheel 117. Thus, the presently disclosed drive sprocket 130 may be employed in any track-type machine, regardless of the size, type, and configuration of the drive system associated with the machine in which it is employed.

Figure 2:
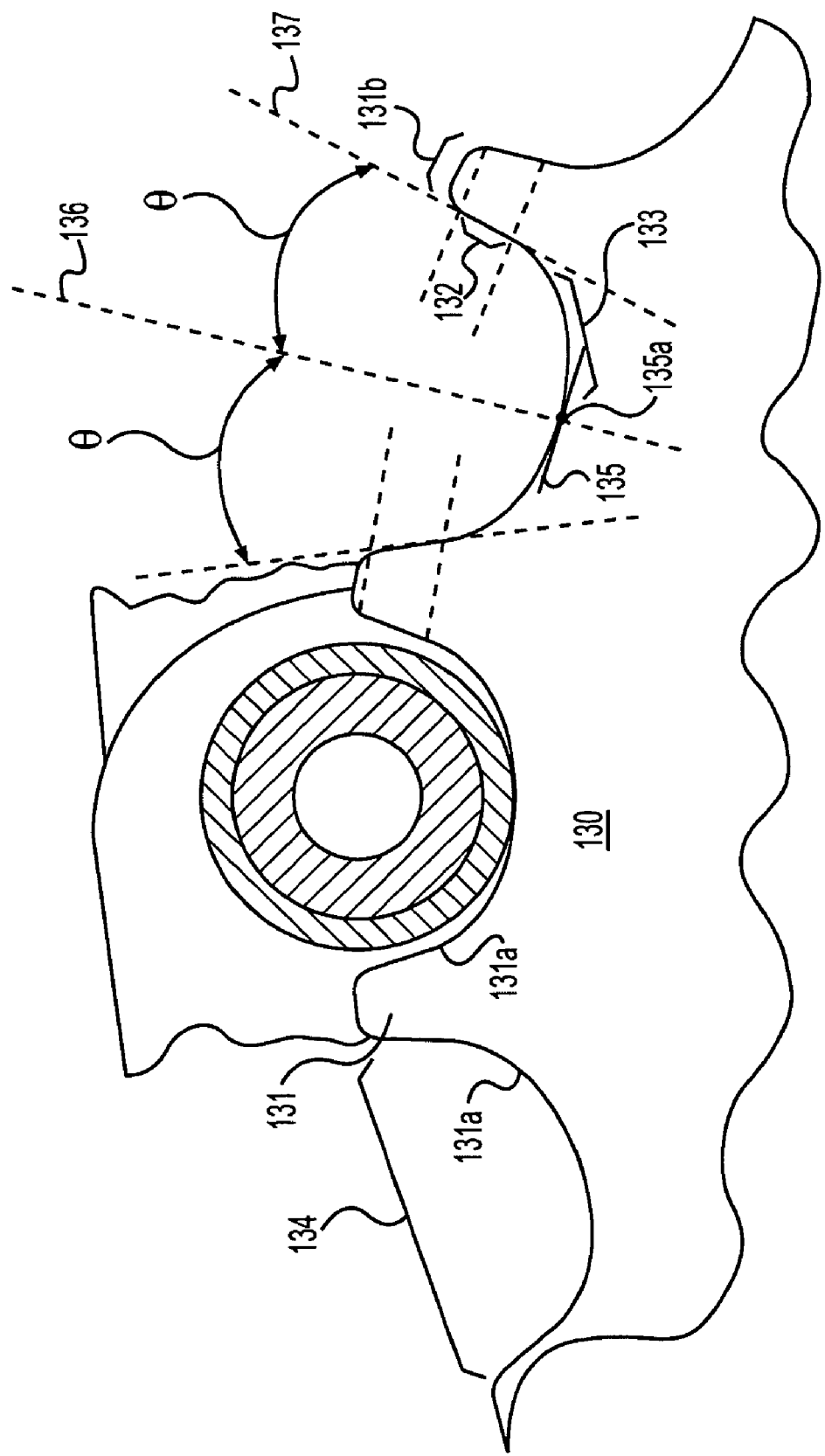
FIG. 2 illustrates an exemplary portion of a sprocketed drive assembly of the track-type machine of FIG. 1, in accordance with the disclosed embodiments.

As illustrated in FIG. 2, drive sprocket 130 may include a plurality of teeth 131 disposed radially about the cylindrical surface of drive sprocket 130. Each of the plurality of teeth 131 may include a plurality of tooth flanks 131a and a top surface 131b. Each tooth flank 131a may comprise a substantially flat portion 132 (at or near top surface 131b of tooth 131) and a substantially convex (i.e., curved) portion 133. Each tooth flank 131a faces opposite the center (or "peak") of a respective tooth 131 and top surface 131b.

As explained, tooth flanks 131 a may include a substantially flat portion 132 and substantially convex portion 133. Substantially flat portion 132 of tooth flank 131a comprises a portion of tooth flank 131a having a substantially uniform slope. According to one exemplary embodiment, substantially flat portion 132 is located at or near the top portion of tooth 131, where the tooth flank 131a interfaces with the top surface 131b of the tooth. Substantially convex portion 133 may comprise a surface that complements the rounded shape of bushings 114 associated with pin members 113. In accordance with one exemplary embodiment, substantially convex portion is located at or near the base of tooth flank 131a (near the circumferential edge of drive sprocket 130, where bushing 114 "rides" when seated in drive sprocket 130). By providing a curved surface at or near the base of each tooth flank 131a and a relatively constant and steep flat portion 132 at or near the top of tooth flank 131a, drive sprocket 130 is ideally shaped to provide flexibility of movement of bushing 114 when seated, while preventing bushing 114 from "jumping" out of the seated position.

As illustrated in FIG. 2, opposing tooth flanks of adjacent teeth form a channel 134 for receiving therein bushing 114 associated with pin member 113. Channel 134 includes a midpoint 135a, such that a tangent 135 that includes midpoint 135a is orthogonal to a radial line drawn from the center of drive sprocket 130.

Tooth flanks 131a may each include a tooth angle, θ, which is measured as the angle between a radial line 136 that passes from the center of drive sprocket 130 through midpoint 135a and a line 137 that includes flat portion 132 of tooth flank 131a. Drive sprockets consistent with the disclosed embodiments include tooth flanks 131a, each of which has a tooth angle, θ, of less than about 17 degrees. According to one exemplary embodiment, drive sprockets may include tooth flanks 131a having tooth angles of between 10 and 17 degrees. In accordance with another exemplary embodiment, tooth flanks 131a may be customized to include a tooth angle that represents an ideal balance between the sprocket's ability to reduce "jumping", without making the tooth angle of tooth flanks 131a unnecessarily steep. For example, for some typical track-type machines having track assemblies with standard-sized bushing diameters, tooth flanks 131a of between approximately 12 degrees and 13 degrees provides an ideal tooth angle for limiting "jumping," without unnecessarily negative impact on the operation of machine 100.

Figure 3A:
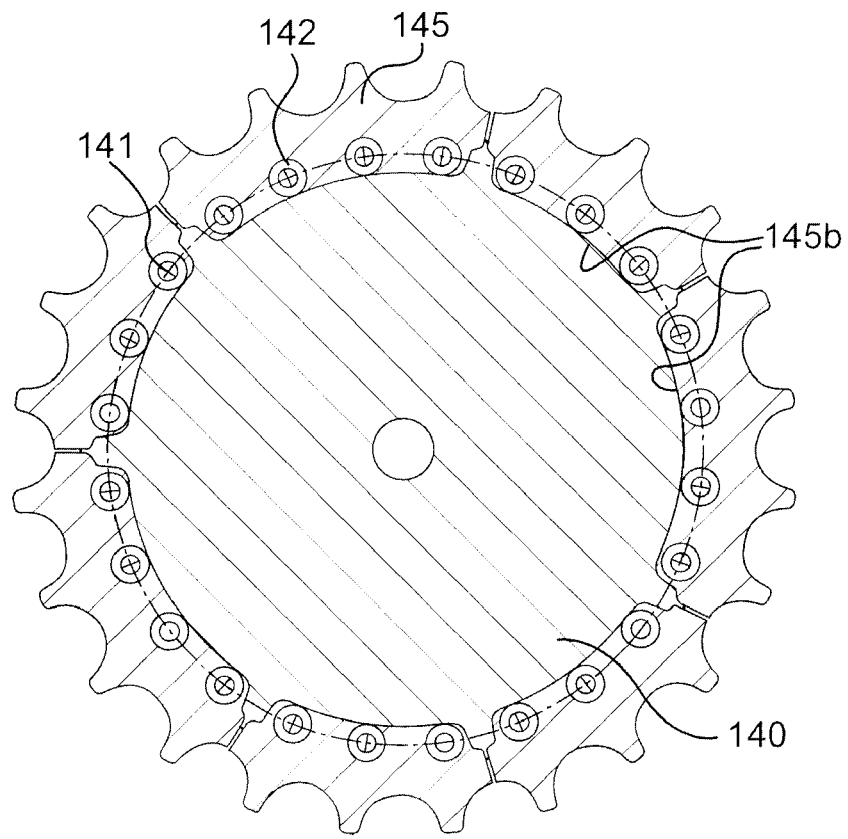
FIG. 3a illustrates a cross-sectional view of an exemplary sprocketed drive assembly comprising a cylindrical wheel portion and a plurality of teeth segments, consistent with certain disclosed embodiments.
Figure 3B:
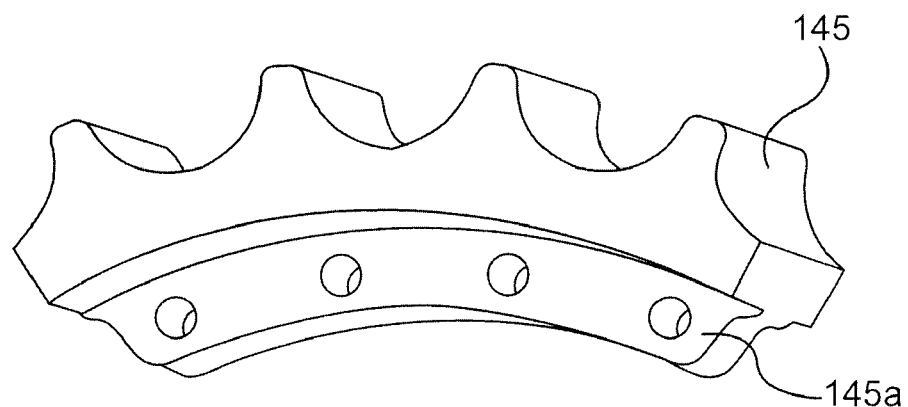

It is contemplated that drive sprocket 130 may be manufactured as a single element, with each of the plurality of teeth 131 integrally formed from a single piece of material. Alternatively, and as illustrated in FIGS. 3A and 3B, drive sprocket 130 may be assembled from a plurality of components, each of which may have been independently manufactured. For example, as illustrated in FIG. 3A, drive sprocket 130 may include a wheel portion 140 having a plurality of holes 141 for mounting a plurality of individual sprocketed teeth segments 145, each segment having a plurality of holes corresponding to holes 141 associated with wheel portion 140. Consequently, each of sprocket teeth segments 145 may be secured to wheel portion 140 using fastening devices 142 (including, for example, nuts and bolts, threaded machine bolts, rivets, of any other suitable mechanical fastening device). Alternatively or additionally, one or more of sprocketed teeth segments 145 may be secured to wheel portion 140 using temporary or permanent welding techniques.

According to one exemplary embodiment and as illustrated in FIG. 3B, each of sprocketed teeth segments 145 may include a flange 145a that is designed to fit in a corresponding groove (see FIG. 3A) or mounting channel 145b associated with wheel portion 140. The mounting channel 145b may be integrally formed within the cylindrical surface of the cylindrical wheel portion. Flange 145a may be configured to ensure proper alignment of each of sprocketed teeth segments 145. Furthermore, flange 145a, when properly seated and secured within a groove of wheel portion 140, may prevent lateral movement and/or twisting of sprocketed teeth segments 145 relative to wheel portion 140.

INDUSTRIAL APPLICABILITY

The presently disclosed drive sprocket assembly may be employed in any track-type machine. More specifically, the drive sprocket assembly described herein may be particularly advantageous in elevated-sprocket track-type machines, which are particularly susceptible to the track "jump" phenomenon, which is characterized by the skipping of the teeth of the drive sprocket across one or more bushings of the track assembly. Because less of the track assembly interacts with the drive sprocket in elevated-sprocket track-type machines, there is less resistive force holding the bushings of the track assembly within channels formed by the teeth of the drive sprocket, which, in turn, renders the machine vulnerable to track "jumping", particularly as the rotational force of the drive sprocket increases. By decreasing the tooth angle of the drive sprocket (and, therefore, making the sprocket teeth more steep), the rotational force needed to slip or "jump" over the steeper tooth angle increases, potentially limiting the occurrence of track "jump."

The drive sprocket assembly with optimized tooth angle described herein may include several advantages over conventional drive assemblies. For example, the tooth angle of the presently disclosed drive sprocket assembly is less than that of conventional drive sprocket assemblies. As explained, decreasing the tooth angle (which corresponds to an increase in the steepness of the tooth angle) of the drive sprocket corresponds to an increase in the resistance of the drive sprocket to forces that the bushing of the track assembly exerts on the teeth of the drive sprocket. As a result, track-type machines equipped with the drive sprocket assembly described herein may support larger loads (and the corresponding increase in rotational force associated therewith) before becoming susceptible to the track "jump" phenomenon.

Moreover, decreasing the drive sprocket tooth angle, as described herein, may not necessarily require a corresponding increase in the size of the drive sprocket or drive lugs. Consequently, the presently disclosed drive sprocket having a steeper tooth angle can be manufactured from the same amount or less material than is required for a conventional drive sprocket having a less steep tooth angle. As a result, the weight of a drive sprocket manufactured in accordance with the disclosed embodiments may not negatively impact the power to weight ratio (efficiency) of the drive system.

It will be apparent to those skilled in the art that various modifications and variations can be made to the disclosed sprocketed drive assembly for track-type machines without departing from the scope of the invention. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A sprocket assembly for a track-type machine, comprising a plurality of teeth, radially-disposed about a center of the sprocket assembly, each of the plurality of teeth comprising opposing tooth flanks, each tooth flank including a substantially flat portion at one end and a curved portion at an opposite end, wherein the curved portions of the tooth flanks of successive pairs of teeth intersect to define a substantially concave channel therebetween, the substantially concave channel having a base formed by the intersecting curved portions, the substantially concave channel being adapted to receive therein a cylindrical pin member associated with a track link member of a continuous track chain, each tooth flank having a tooth angle less than about 17 degrees.

2. The sprocket assembly of claim 1, wherein the tooth angle is between about 10 degrees and about 17 degrees.

3. The sprocket assembly of claim 1, wherein the tooth angle is between about 12 degrees and about 13 degrees.

4. The sprocket assembly of claim 1, wherein the plurality of teeth and the sprocket assembly comprise a single, integral unit.

5. The sprocket assembly of claim 1, wherein the sprocket assembly further includes a cylindrical wheel portion and one or more teeth segments, each of the cylindrical wheel portion and the one or more teeth segments having a plurality of holes for removably mounting the one or more teeth segments about a cylindrical surface of the cylindrical wheel portion.

6. The sprocket assembly of claim 5, wherein the cylindrical wheel portion further includes a mounting channel for receiving therein a flange associated with one or more teeth segments, wherein the mounting channel is integrally formed within the cylindrical surface of the cylindrical wheel portion.

7. The sprocket assembly of claim 1, wherein the base of the concave channel includes a curved contour that complements a shape of a mating surface of the cylindrical pin member.

8. A track assembly for a track-type machine, comprising:
a plurality of link members;
a plurality of pin members, each of the plurality of pin members configured to couple adjacent link members together to form a track chain and comprising a rotatable bushing disposed about a cylindrical surface thereof, the rotatable bushing configured to rotate relative to a respective pin member; and
a drive sprocket comprising a plurality of teeth radially disposed about a center of the drive sprocket, each of the plurality of teeth comprising opposing tooth flanks, each tooth flank including a substantially flat portion at one end and a curved portion at an opposite end, wherein the curved portions of the tooth flanks of successive pairs of teeth intersect to define a substantially concave channel therebetween, the substantially concave channel having a base formed by the intersecting curved portions, the substantially concave channel being adapted to receive therein the rotatable bushing, each tooth flank having a tooth angle between about 10 degrees and about 17 degrees.

9. The track assembly of claim 8, wherein the tooth angle is between about 12 degrees and about 13 degrees.

10. The track assembly of claim 8, wherein the plurality of teeth and the drive sprocket comprise a single, integral unit.

11. The track assembly of claim 8, wherein the drive sprocket further includes a cylindrical wheel portion and one or more teeth segments, each of the cylindrical wheel portion and the one or more teeth segments having a plurality of holes for circumferentially mounting the one or more teeth segments about the cylindrical surface of the cylindrical wheel portion.

12. The track assembly of claim 11, wherein the cylindrical wheel portion further includes a mounting channel, integrally formed within the cylindrical surface of the cylindrical wheel portion, for receiving therein a flange associated with one or more teeth segments.

13. The track assembly of claim 8, wherein the base of the concave channel includes a curved contour without a flat section.

14. A track-type machine, comprising:
a plurality of link members;
a plurality of pin members, each of the plurality of pin members configured to couple adjacent link members together to form a track chain and comprising a rotatable bushing disposed about a cylindrical surface thereof, the rotatable bushing configured to rotate relative to a respective pin member;
a driving mechanism for generating a torque output;
a drive sprocket, operatively coupled to the driving mechanism and configured to rotate in response to the torque output generated by the driving mechanism, the drive sprocket comprising a plurality of teeth radially disposed about a center of the drive sprocket, each of the plurality of teeth comprising opposing tooth flanks, each tooth flank including a substantially flat portion at one end and a curved portion at an opposite end, wherein the curved portions of the tooth flanks of successive pairs of teeth intersect to define a substantially concave channel therebetween, the substantially concave channel having a base formed by the intersecting curved portions, the substantially concave channel being adapted to receive therein the rotatable bushing, each tooth flank having a tooth angle less than about 17 degrees.

15. The track-type machine of claim 14, wherein the tooth angle is between about 10 degrees and about 17 degrees.

16. The track-type machine of claim 14, wherein the tooth angle is about 12 degrees.

17. The track-type machine of claim 14, wherein the tooth angle is about 13 degrees.

18. The track-type machine of claim 14, wherein the plurality of teeth and the drive sprocket comprise a single, integral unit.

19. The track-type machine of claim 14, wherein the drive sprocket further includes a cylindrical wheel portion and one or more teeth segments, each of the cylindrical wheel portion and the one or more teeth segments having a plurality of holes for circumferentially mounting the one or more teeth segments about the cylindrical surface of the cylindrical wheel portion.

20. The track-type machine of claim 19, wherein the cylindrical wheel portion further includes a mounting channel, integrally formed within the cylindrical surface of the cylindrical wheel portion, for receiving therein a flange associated with one or more teeth segments.

\* \* \* \* \*

UNITED STATES PATENT AND TRADEMARK OFFICE
CERTIFICATE OF CORRECTION

| | | |
|---|---|---|
| PATENT NO. | : 8,070,240 B2 | Page 1 of 1 |
| APPLICATION NO. | : 12/316932 | |
| DATED | : December 6, 2011 | |
| INVENTOR(S) | : Zheng et al. | |

It is certified that error appears in the above-identified patent and that said Letters Patent is hereby corrected as shown below:

Title Page,

Column 1, Item 75 (Inventors), line 1, delete "Peroia, IL (US);" and insert -- Peoria, IL (US); --.

Column 1, Item 75 (Inventors), line 5, delete "Tamit Nadu (IN)" and insert -- Tamil Nadu (IN) --.

In the Specification,

Column 5, lines 25, delete "flanks 131 a" and insert -- flanks 131a --.

Signed and Sealed this
Twenty-eighth Day of July, 2015

Michelle K. Lee
*Director of the United States Patent and Trademark Office*